Figure 1:
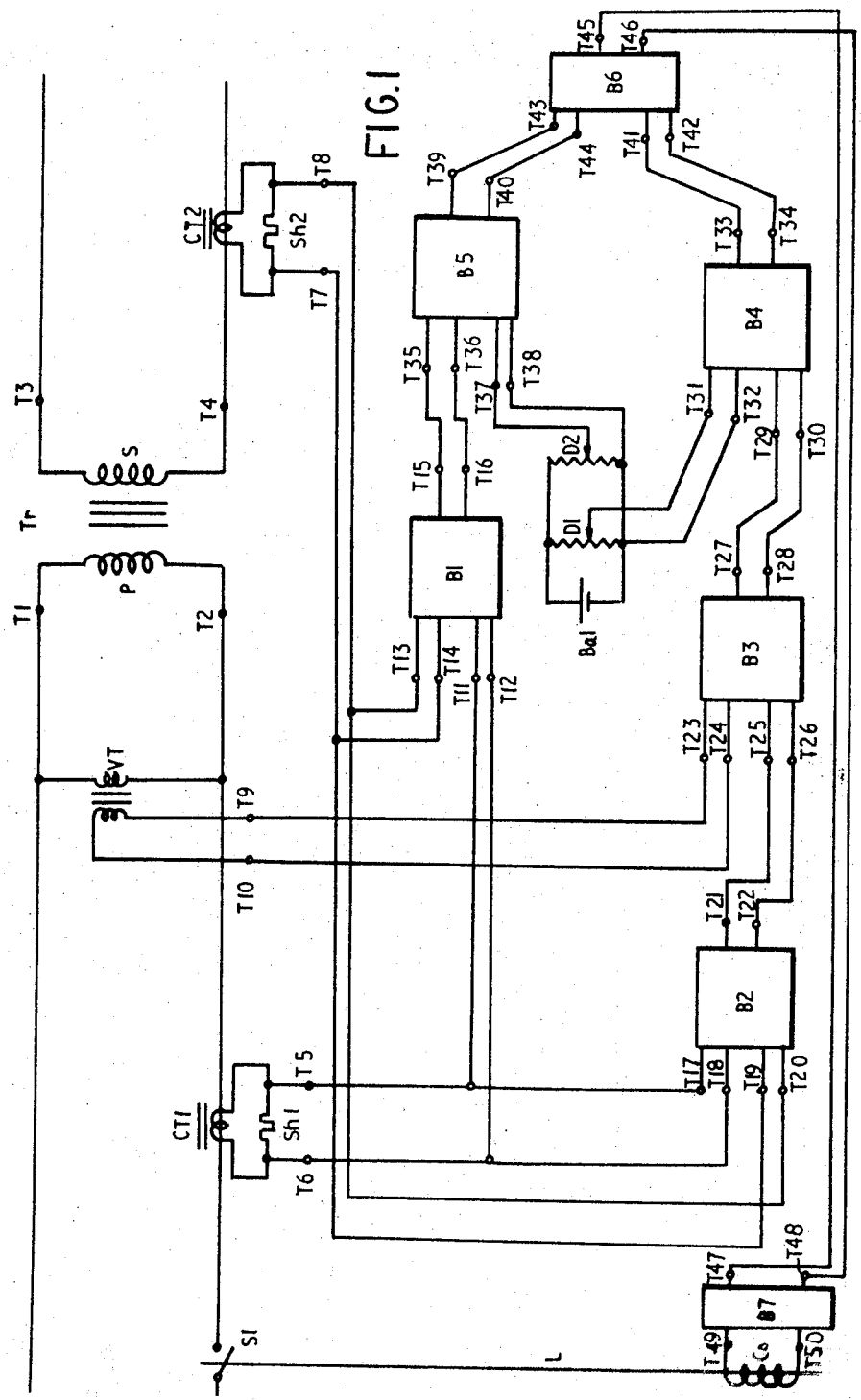

United States Patent [19]
Sykes

[11] 3,754,163
[45] Aug. 21, 1973

[54] PROTECTION OF TRANSFORMERS

[76] Inventor: James Albert Sykes, 419 Skipton St., Ballarat, Australia

[22] Filed: Sept. 21, 1972

[21] Appl. No.: 290,887

[30] Foreign Application Priority Data
Sept. 24, 1971 Australia.......................... PA6404/71

[52] U.S. Cl............... 317/14 D, 317/27 R, 317/32, 317/49
[51] Int. Cl........................... H02h 7/04, H02h 3/26
[58] Field of Search .............. 317/14 R, 14 B, 14 C, 317/14 D, 14 K, 27 R, 31, 32, 49

[56] References Cited
UNITED STATES PATENTS
2,579,042  12/1951  Headley................................ 317/49
3,414,772  12/1968  Sonnemann........................ 317/14 R
3,579,040   5/1971  Tenenbaum....................... 317/14 D Primary Examiner—William M. Shoop, Jr.
Assistant Examiner—Harvey Fendelman
Attorney—Michael S. Striker

[57] ABSTRACT

A system for the protection of electrical power transformers in the event of a fault occurring in which measurements of both the differential current and the voltage at the terminals of one of the windings of the transformer are utilised to provide a tripping signal to disconnect the transformer in the event of a fault occurring. The system distinguishes between a fault and a magnetising inrush situation by detecting saturation of the transformer core and operates faster than protective devices utilising a measurement of differential current only.

4 Claims, 12 Drawing Figures

PROTECTION OF TRANSFORMERS

The present invention relates to a system for the protection of electrical power transformers in the event of a fault occurring.

The most successful and widely used method of transformer fault protection is differential protection. In this method a differential current, which is the difference between the measured values of the input and output currents of the transformer, with due correction for the effects of the ratio of transformation, is monitored continuously by a relay.

This method is based on the hypothesis that a substantial level of differential current indicates the existence of a fault in the transformer. A problem arises however because large values of differential current occur during saturation of the transformer (magnetizing inrushes), a quite normal and acceptable temporary condition, and it is necessary that the protective devices be prevented from tripping the transformer under these conditions.

In the application of differential protection systems various approaches have been adopted to prevent operation of protective devices during magnetizing inrushes. However a common feature of the methods at present used in a delay in their operation which occurs because it is necessary to wait for certain characteristics of the differential current to become apparent before it can be classified as being due to a magnetizing inrush or a fault. During most of the first cycle of an increase in the differential current there is no reliably detectable difference between an increase which arises from a magnetizing inrush and one arising from a fault in the transformer.

The present invention provides an improved system for detecting the presence of faults in transformers. This sytem does not rely on the detection of characteristic features of the differential current alone. Instead it utilises measurement of the transformer voltage as well as current measurements for the detection of saturation of the transformer core, which is a characteristic feature of the magnetizing inrush situation. By this approach the delay inherent in differential protection is avoided and faster operation of protective devices can be achieved.

In order that the invention may be better understood and put into practice a preferred form thereof is hereinafter described by way of example, with reference to the accompanying drawings in which:

FIG. 1 is a diagram illustrating a complete protective system according to the invention as applied to a single phase transformer.

Figure 2:
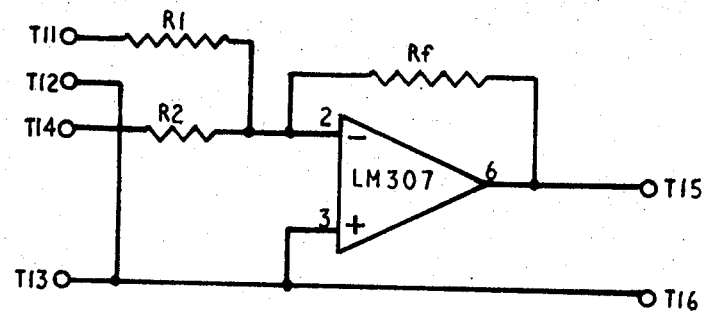
Figure 4:
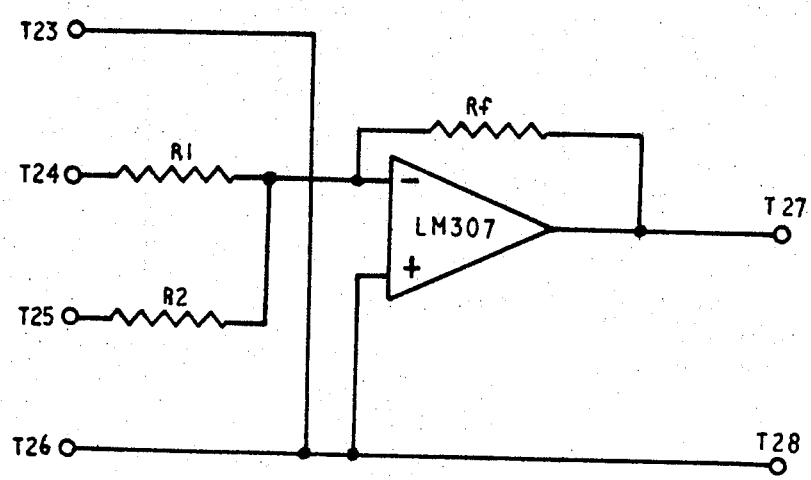
Figure 3:
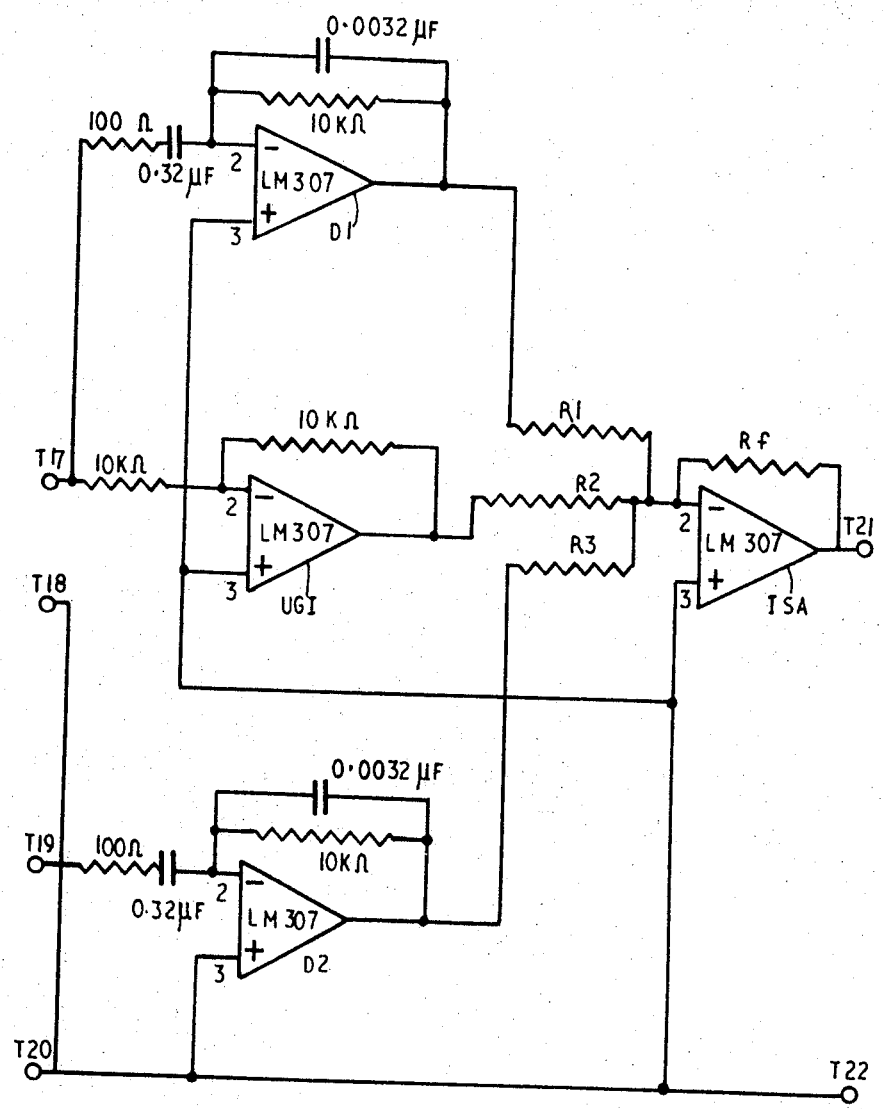
Figure 5:
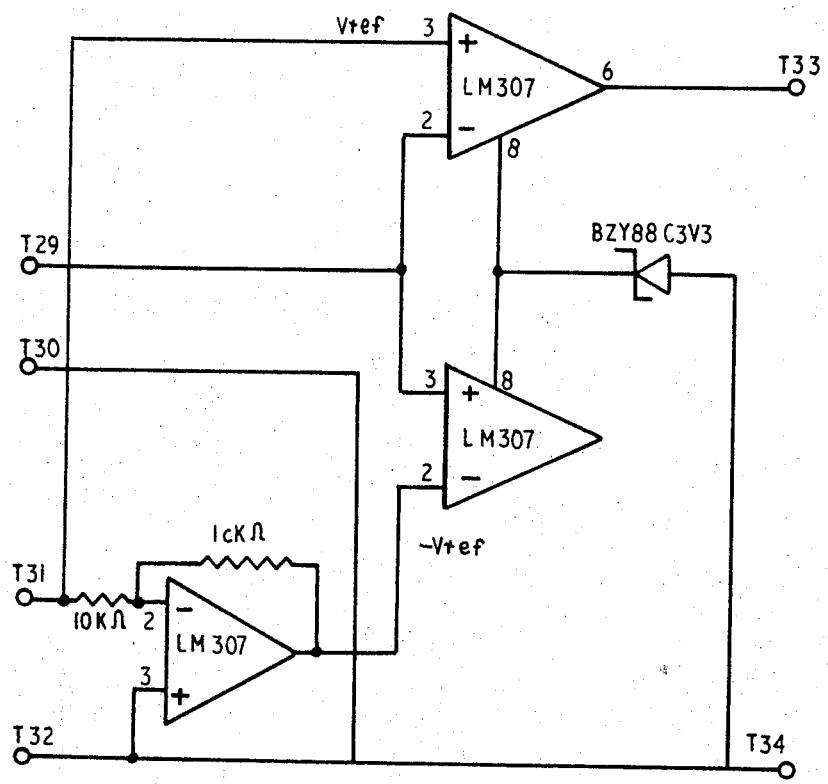
Figure 6:
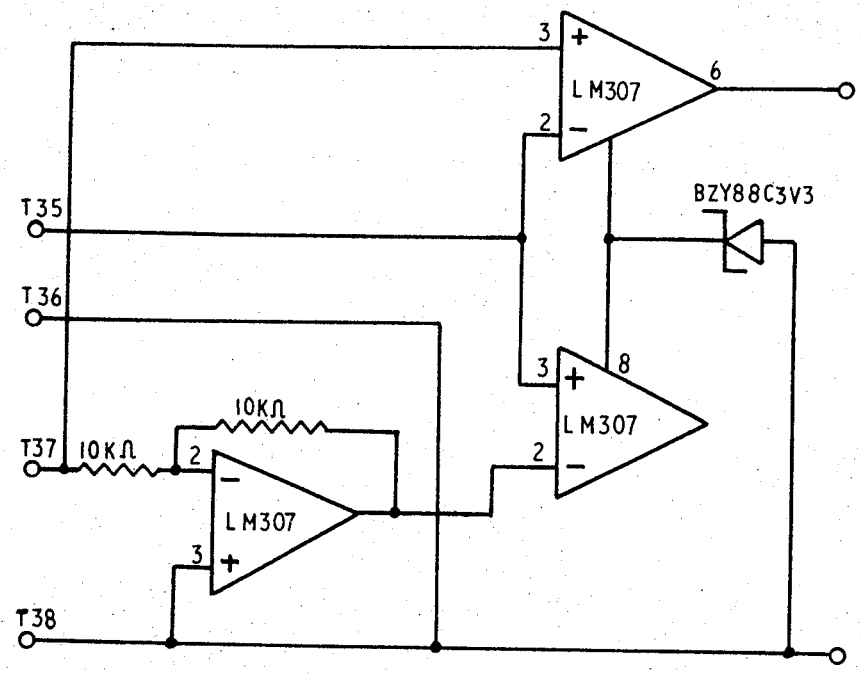
Figure 7:
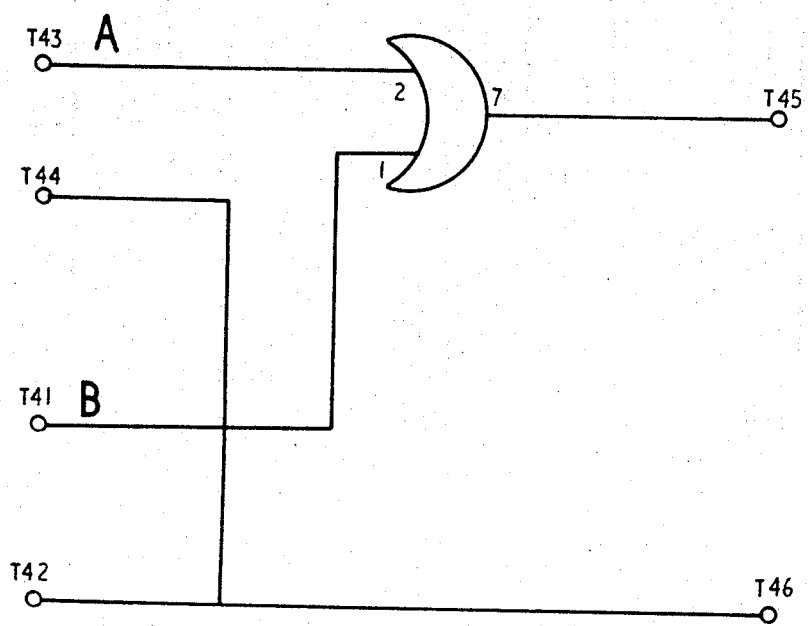
Figure 8:
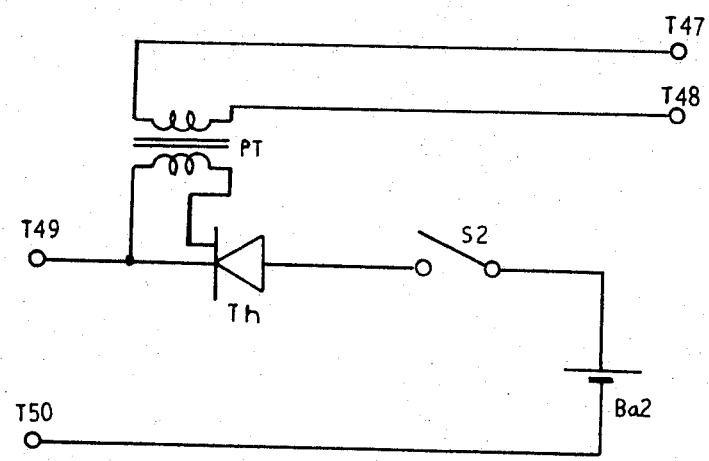
Figure 10:
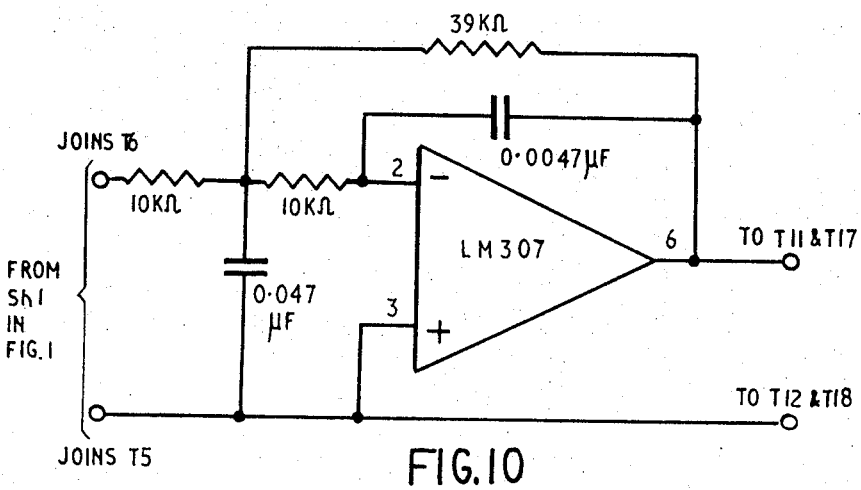
Figure 9:
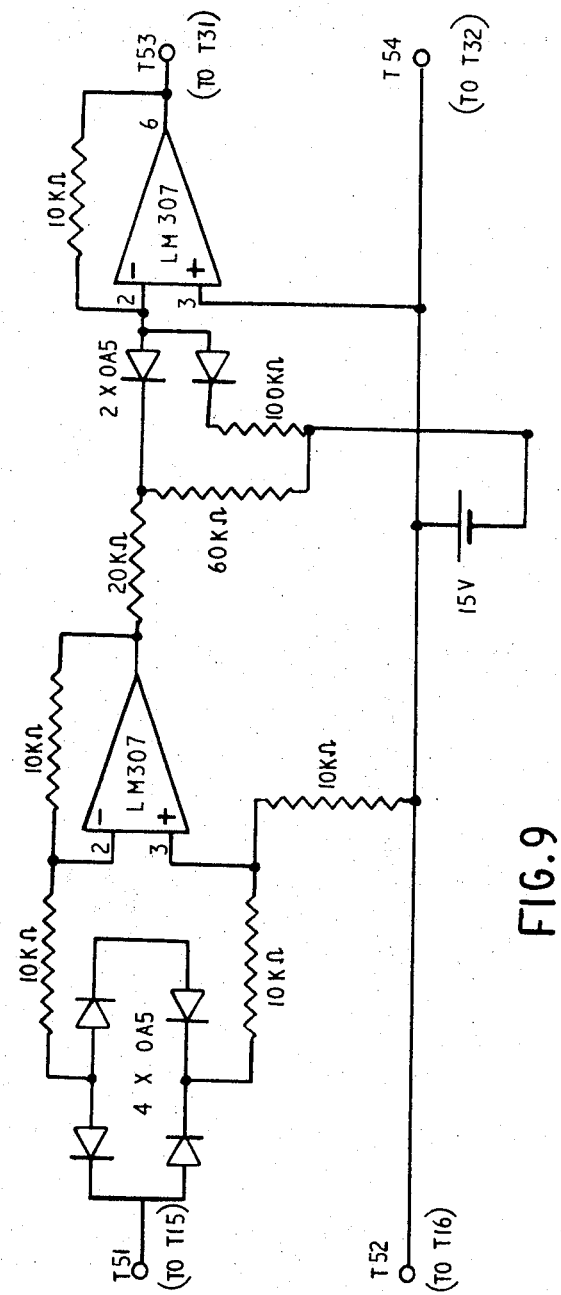
Figure 11:
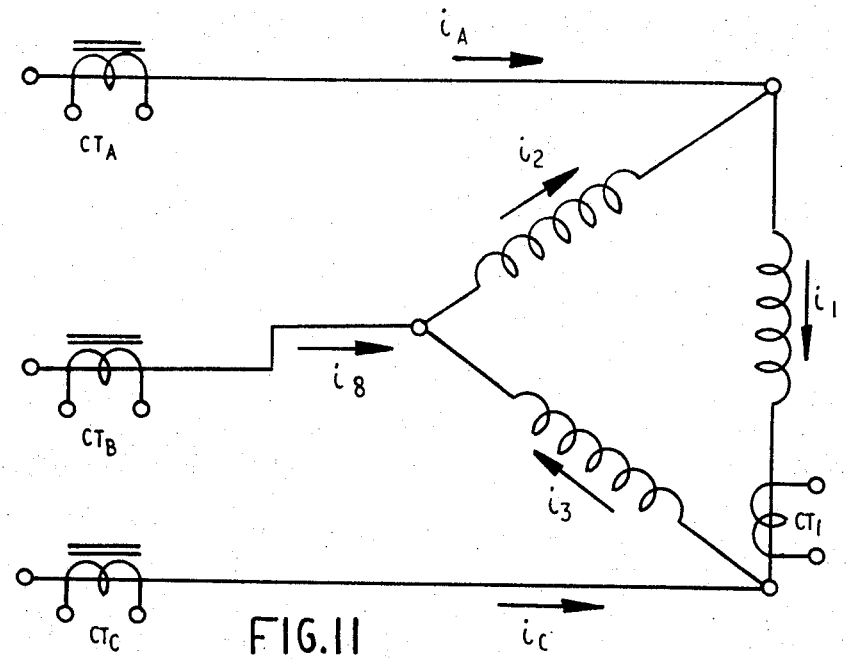
Figure 12:
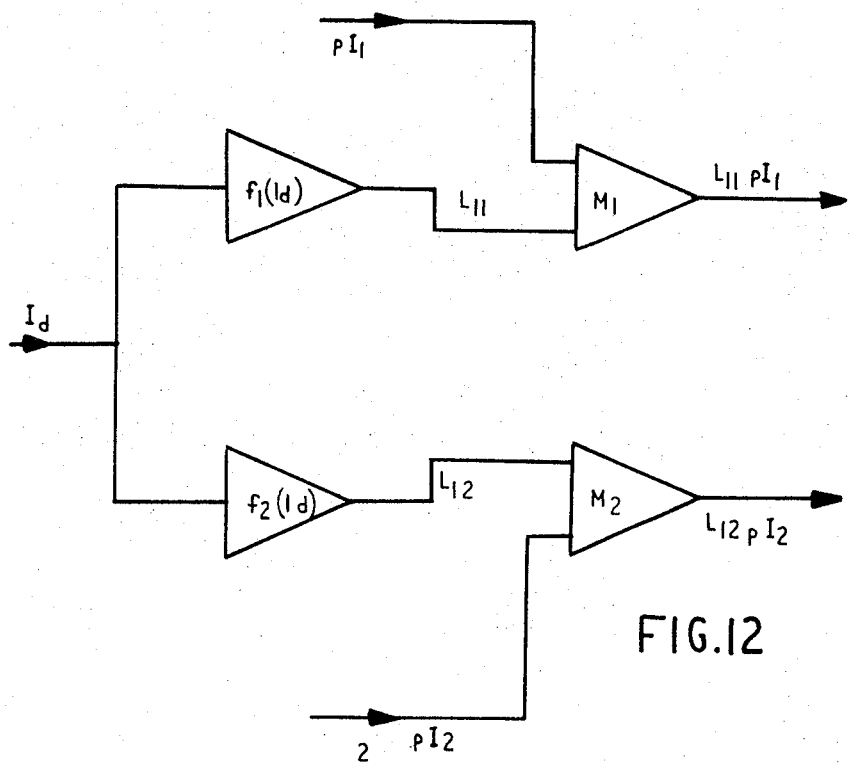

FIG. 2 is a circuit diagram of the means $B_1$;
FIG. 3 is a circuit diagram of the means $B_2$,
FIG. 4 is a circuit diagram of the means $B_3$,
FIG. 5 is a circuit diagram of the means $B_4$,
FIG. 6 is a circuit diagram of the means $B_5$,
FIG. 7 is a circuit diagram of the means $B_6$,
FIG. 8 is a circuit diagram of the means $B_7$,
FIG. 9 is a circuit diagram of an additional means $B_8$ that may be connected in the circuit of FIG. 1 to produce a variable reference level voltage, FIG. 10 is a circuit diagram of an additional filter for filtering the voltage representing the primary current, FIG. 11 is a circuit diagram illustrating the manner in which current is measured in a delta connected three-phase transformer winding and, FIG. 12 is a circuit diagram and means for estimating the terminal voltage of the transformer more accurately.

The system is applied to a transformer $Tr$ having a primary winding P with terminals $T_1$ and $T_2$ and a secondary winding S with terminals $T_3$ and $T_4$.

Current transformers $CT_1$, $CT_2$ and shunts $Sh_1$ and $Sh_2$ constituting means for measuring the currents in the transformer windings P and S are connected as shown. The current transformer $CT_1$ and the shunt $Sh_1$ produce a voltage between terminals $T_5$ and $T_6$ which is proportional to the instantaneous value of the current flowing in the primary winding P of the transformer. The current transformer $CT_2$ and shunt $Sh_2$ produce a voltage between terminals $T_7$ $T_8$ which is proportional to the instantaneous value of the current flowing in the secondary winding of the transformer. The connections of the current transformers and shunts are so arranged that the voltage at terminal $T_5$ is positive relative to that at terminal $T_6$, when the direction of current flow is into the winding P at terminal $T_1$ and so that the voltage at terminal $T_7$ is positive relative to that at terminal $T_8$ when the direction of current flow is into the winding S at terminal $T_3$.

A voltage transformer VT, constituting a means for measuring the voltage across one of the transformer windings is connected as shown. The voltage transformer VT produces a voltage between the terminals $T_9$ and $T_{10}$ which is proportional to the instantaneous value of the voltage existing between the terminals $T_1$ and $T_2$ of the primary winding R. The connections are so arranged that the voltage at terminal $T_9$ is positive relative to that at $T_{10}$ when the voltage at $T_1$ is positive relative to that at $T_2$.

A means $B_1$ of measuring the value of the differential current, details of which are described below, is connected as shown. The voltage proportional to primary current enters $B_1$ at a pair of terminals $T_{11}$ and $T_{12}$. The voltage proportional to secondary current enters $B_1$ at a pair of terminals $T_{13}$ and $T_{14}$. The output voltage appearing at the terminals $T_{15}$ and $T_{16}$ of $B_1$ is proportional to the instantaneous value of the differential current.

A means $B_2$ of using the measurements of primary and secondary current to estimate an expected value for the voltage at the primary terminals of the transformer is connected as shown and described in detail below. The voltage proportional to primary current enters $B_2$ at a pair of terminals $T_{17}$ and $T_{18}$. The voltage proportional to secondary current enters $B_2$ at a pair of terminals, $T_{19}$ and $T_{20}$. The voltage appearing at the output terminals $T_{21}$ and $T_{22}$ of $B_2$ is proportional to the expected value of the voltage between the terminals $T_1$ and $T_2$ of the transformer.

A means $B_3$ of determining the difference between the measured primary voltage and the expected value of the primary voltage is connected as shown and described in detail below. The voltage proportional to the measured value of the primary voltage enters $B_3$ at a pair of terminals $T_{23}$ and $T_{24}$. The voltage proportional to the expected value of the primary voltage enters $B_3$ at a pair of terminals $T_{25}$ and $T_{26}$. The voltage appearing between the output terminals $T_{27}$ and $T_{28}$ of $B_3$ is proportional to the instantaneous value of the difference between the measured primary voltage and the expected value of the primary voltage. This difference between the measured and expected values of the primary voltage is hereinafter referred to as the voltage error.

A means $B_4$ of indicating when the magnitude of the voltage error exceeds a pre-determined reference value is connected as shown and described in detail below. The voltage proportional to the voltage error enters $B_4$ at a pair of terminals $T_{29}$ and $T_{30}$. The voltage representing the reference value enters $B_4$ at a pair of terminals $T_{31}$ and $T_{32}$. The voltage appearing at the output terminals $T_{33}$ and $T_{34}$ of $B_4$ has one constant value when the magnitude of the voltage error is less than the reference value and a second constant value when the magnitude of the voltage error is greater than the reference value, i.e., it is a logic output. The reference voltage for $B_4$ is produced by the battery $Ba_1$ and the voltage divider $D_1$.

A means $B_5$ of indicating when the magnitude of the differential current exceeds a predetermined reference value is connected as shown and described below. The voltage proportional to the differential current enters $B_5$ at a pair of terminals $T_{35}$ and $T_{36}$. The voltage representing the reference value enters $B_5$ at a pair of terminals $T_{37}$ and $T_{38}$. The voltage appearing at the output terminals $T_{39}$ and $T_{40}$ of $B_5$ has one constant value when the magnitude of the differential current is less than the reference value and a second constant value when the magnitude of the differential current is greater than the reference value, i.e., it is a logic output. The reference voltage for $B_5$ is produced by the battery $Ba_1$ and the voltage divider $D_2$.

A means $B_6$ of generating a signal to initiate disconnection of the supply to the transformer i.e., a tripping signal is connected as shown and described below. The logic signal from $B_4$ enters $B_6$ at a pair of terminals $T_{41}$ and $T_{42}$. The logic signal from $B_5$ enters $B_6$ at a pair of terminals $T_{43}$ and $T_{44}$. The output voltage appearing between terminals $T_{45}$ and $T_{46}$ of $B_6$ has a first constant value which indicates that the transformer should be disconnected whenever both the magnitude of the voltage error and current simultaneously exceed their respective reference values, and a second constant value which indicates that the transformer should not be disconnected at all other times.

Disconnection of the supply from the transformer when $B_6$ indicates that disconnection is required is affected through the circuit $B_7$ described below, the coil Co, Line L and switch $S_1$.

The mode of operation of the system is as follows: The means $B_2$ calculates the expected terminal voltage on the basis that it may be found from the equation $$V_1 = R_1 i_1 + L_{11} p i_1 + L_{12} p i_2$$

in which
$V_1$ = primary voltage
$i_1$ = primary current
$i_2$ = secondary current
$R_1$ = resistance of primary winding
$L_{11}$ = self inductance of primary winding
$L_{12}$ = mutual inductance
p indicates differentiation with respect to time The values of the inductances $L_{11}$ and $L_{12}$ are influenced by the level of magnetic flux density existing in the core of the transformer. Hence no set of constant values for the inductances can accurately model the transformer performance for its full range of operation. The inductance values used in means $B_2$ are selected to represent the operation of the transformer when the core is saturated.

Consequently when the differential current is large because the flux density in the transformer core is above the saturation value, as occurs during part of each cycle when the transformer is undergoing a magnetizing inrush, the value of the expected voltage generated by means $B_2$ is approximately equal to the value of the measured voltage. Hence even though the means $B_5$ indicates that the magnitude of the differential current is excessive, the means $B_6$ does not generate a tripping signal because the means $B_4$ indicates that the voltage error is small.

Then the differential current is small because the flux density in the core is less than the saturation level, as occurs during normal steady operation of the transformer or during part of each cycle when the transformer is undergoing a magnetising inrush, the value of the expected voltage generated by means $B_2$ differs considerably from the measured voltage because the means $B_2$ does not accurately represent the transformer under these circumstances. As a result means $B_4$ indicates that the magnitude of the voltage error is greater than its reference value. Nevertheless the means BE does not generate a tripping signal because the means $B_5$ indicates that the magnitude of the differential current is less than its reference value.

When a fault occurs in the transformer, the differential current is large. Furthermore, the voltage error is also large because the means $B_2$ does not accurately model the faulty transformer. Hence the means $B_6$ generates a tripping signal because the means $B_4$ indicates that the magnitude of the voltage error is greater than its reference value and the means $B_5$ indicates that the magnitude of the differential current is greater than its reference value.

The various parts of the system are now described in more detail below. It should however be understood that these are given by way of example only.

Details of Means $B_1$

The means $B_1$ for measuring the value of the differential current, shown in FIG. 2, uses an LM307 integrated circuit operational amplifier arranged as an inverting summing amplifier. The inputs at the terminal pairs $T_{11}$, $T_{12}$ and $T_{14}$, $T_{13}$ are added in proportions determined by the resistance ratios $R_f/R_1$ and $R_f/R_2$ respectively. The negative of this sum of inputs appears at the output terminal pair $T_{15}$, $T_{16}$.

Details of Means $B_2$

The means $B_2$, shown in FIG. 3, uses LM307 integrated circuit operational amplifiers. One of these, arranged as differentiator $D_1$ computes the term $-p i_1$ appearing in equation 1. The differentiator $D_2$ computes $-p i_2$. The unity gain inverter UGI computes $-i$, from $i_1$. The inverting summing amplifier ISA adds $-p i_1$, $-p i_2$ and $-I_1$ in the proportions required to correctly model the saturated transformer. Hence the parameters $R_1$, $L_{11}$ and $L_{12}$ which appear in equation 1 are modelled by the ratios $R_f/R_2$, $R_f/R_1$ and $R_f/R_3$ respectively.

Details of Means $B_3$

The means $B_3$, shown in FIG. 4, uses an LM307 integrated circuit operational amplifier arranged as a unity gain inverting summing amplifier. The resistors $R_f$ $R_1$ and $R_2$ are all equal in value so that the output voltage at the terminal pair $T_{27}$, $T_{28}$ is the negative of the sum of the two input voltages at the terminal pairs $T_{24}$, $T_{23}$ and $T_{25}$, $T_{26}$.

Details of Means $B_4$

The means $B_4$, shown in FIG. 5, uses three LM307 integrated circuit operational amplifiers. Two of these are arranged as a double-sided limit detector, and one is connected as a unity gain inverting amplifier. The output of the double-sided limit detector, which appears between terminals $T_{33}$ and $T_{34}$, is a voltage which has a value of approximately 4v when the input voltage at terminals $T_{29}$ and $T_{32}$ is between the limiting values of voltage Vref and −Vref which are established by the input between terminals $T_{31}$ and $T_{32}$ and the unity gain inverter, and which falls to approximately zero voltage when the input voltage at terminals $T_{29}$ and $T_{32}$ is outside the limiting values.

Details of Means $B_5$

The means $B_5$, shown in FIG. 6, is identical with means $B_4$.

Details of Means $B_6$

The means $B_6$, shown in FIG. 7, uses an integrated circuit input NOR gate (F$\mu$L 991428). With the input voltage at $T_{43}$ denoted by A, and that at $T_{41}$ denoted by $B_1$ the output voltage at $T_{45}$, denoted by F, is given by the Boolean expression.

$F = \overline{A + B}$ i.e., positive logic is used, with a positive voltage representing TRUE and zero voltage representing FALSE.

Details of Means $B_7$

The means $B_7$, shown in FIG. 8, provides the power to operate the coil Co of the switch $S_1$, when tripping of the transformer is required.

The tripping signal from terminal $T_{45}$ and $T_{46}$ of means $B_6$ enters means $B_7$ at terminals $T_{47}$ and $T_{48}$ and passes through a pulse transformer PT to the gate circuit of a thyristor Th. If switch $S_2$ is closed, the gating signal fires the thyristor and causes the voltage from the DC source $Ba_2$ to be applied to the coil CO via terminals $T_{49}$ and $T_{50}$.

applied to the coil CO via terminals $T_{49}$ and $T_{50}$.

The operation of the system illustrated in FIG. 1 may be modified in certain respects by the addition of one or more of the devices described below.

An additional means $B_8$ illustrated in FIG. 9 may be used to produce a variable reference level voltage for means $B_4$ to replace the fixed reference level voltage generated by $Ba_1$ and $D_1$.

The variable reference level voltage is a function of the differential current of the transformer. Hence the voltage at the terminals $T_{15}$ and $T_{16}$ of the means $B_5$, representing the differential current, enters the means $B_8$ at a pair of terminals $T_{51}$, $T_{52}$. The output voltage of the means $B_8$ which appears between terminals $T_{53}$ and $T_{54}$ is applied to the terminals $T_{31}$ and $T_{32}$ of means $B_4$ instead of the supply from $D_1$ as shown in FIG. 1.

Details of Means $B_8$

The means $B_8$, shown in FIG. 9, uses four OA5 diodes and an LM307 integrated circuit operational amplifier arranged as a full-wave rectifier. The output voltage of the rectifier is applied to a two-section piecewise-linear function generator which also uses an LM307 operational amplifier.

The means $B_8$ functions in such a manner that the value of the reference level voltage (at $T_{53}$, $T_{54}$) is raised when the magnitude of the voltage representing differential current decreases. The exact values of the resistors shown in FIG. 9 will depend on the transformer parameters.

If it is necessary to remove unwanted high frequency components from the voltages representing measured primary voltage, measured primary current and measured secondary current each of these voltages may be caused to undergo low pass filtering.

The filtering of each of these voltages is performed in the same way and the additional means for providing this filtering is shown in FIG. 10 which illustrates the filtering of the voltage representing primary current.

The voltage produced by means $CT_1$ and $Sh_1$ is FIG. 1 passes through an active filter circuit which attenuates all frequency components above 500Hz. The active filter circuit utilises an LM307 integrated-circuit operational amplifier arranged as a second order low pass filter. After passing through the active filter the voltage representing primary current then goes to means $B_1$ and $B_2$ as in FIG. 1.

The voltage produced by $CT_2$ and $Sh_2$ in FIG. 1 represents the secondary current of the transformer. This voltage passes through a filter similar to that shown in FIG. 10 before going to means $B_1$ and $B_2$ as in FIG. 1.

The voltage produced by VT in FIG. 1 represents the primary voltage of the transformer. It passes through a filter similar to that shown in FIG. 10 before going to means $B_3$ as in FIG. 1.

For the protection of a three phase transformer having a delta connected winding, as in FIG. 11, the measurement of the line currents $i_A$, $i_B$ and $i_C$ by the current transformers $CT_A$, $CT_B$ and $CT_C$ is insufficient to permit the currents $i_1$, $i_2$ and $i_3$, which are needed for the protection, to be found.

An additional means, consisting of a current transformer placed so as to measure any one of the currents $i_1$, $i_2$, $i_3$ is needed. Current transformers $CT_1$ to measure $i_1$ in FIG. 11 illustrates this.

The two other currents required by the protection, namely $i_2$ and $i_3$, are then found by summation of C.T. outputs according to the equations $$i_2 = i_1 - i_A$$
$$i_3 = i_1 + i_C$$

The accuracy of the estimate of the terminal voltage (output of means $B_2$ in FIG. 1) may be improved if the values of the coefficients $L_{11}$ and $L_{12}$ in equation 1 are caused to vary as the differential current changes so as to model more closely the actual physical behaviour of the transformer.

FIG. 12 shows details of this additional means. Voltages representing $pi_1$ and $pi_2$ are obtained from differentiators as described for means $B_2$. The voltage representing differential currents i.e., the voltage from terminals $T_{15}$, $T_{16}$ of means $B_1$ in FIG. 1 is required also. Two function generators, $f_1(i_d)$ and $f_2(i_d)$, have as an input value, this voltage, which represents differential current.

The output of $f_1(i_d)$ is a voltage which represents the coefficient $L_{11}$ in equation 1. The output of $f_2(i_d)$ is a voltage which represents the coefficient $L_{12}$ in equation 1.

Two analog multipliers, $M_1$ and $M_2$, are then used to multiply $L_{11}$ with $pI_1$ and to multiply $L_{12}$ with $pI_2$ in order to generate two of the terms needed for equation 1, namely $L_{11}pi_1$ and $L_{12}pi_2$.

The generator of the term $R_1i$, and the summation of the three terms which constitute equation 1 is performed by means of an inverting summing amplifier as described for means $B_2$.

The improved protection may be implemented in the form of a digital computer programme.

In this all the inputs (voltages at terminal pairs $T_5$, $T_6$, $T_7$, $T_8$, and $T_9$, $T_{10}$) are sampled at regular intervals, converted from analog to digital form and then stored in the memory of a digital computer.

All the precesses performed by means $B_1$ to $B_6$ are contained in the digital computer in the form of a computer programme. The computer thereby simulates the performance of the means $B_1$ to $B_6$, including when required the generation of a tripping signal at a pair of terminals which replace $T_{45}$, $T_{46}$ in FIG. 1.

I claim:

1. A system for protecting transformers against faults consisting of means for measuring the current in each of the windings of the transformer, means for comparing the currents so measured to obtain a measure of the differential current, means for measuring the voltage at the terminals of one winding of the transformer, means for estimating, from the measured values of the currents in the windings, the value of the voltage at the terminals of the said one winding of the transformer, means for determining the magnitude of the difference between the said measured voltage and the said estimated voltage, means for comparing the magnitude of said voltage difference with a reference value and for producing an output indicative of whether the magnitude of said difference is less than or greater than the reference value, means for comparing the magnitude of said differential current with a reference value and for producing an output indicative of whether the magnitude of said differential current is less than or greater than the reference value, means for combining the outputs of the two last mentioned means constructed and arranged to produce a signal that can be used to disconnect the transformer in the event that both the magnitude of the differential current and of the said voltage difference exceed the respective reference values simultaneously.

2. A system as claimed in claim 1 wherein the means for estimating the value of the voltage at the terminals of the said one winding is constructed and arranged to make such estimate on the basis that the core of the transformer is saturated.

3. A system as claimed in claim 1 including means to produce a reference value with which the said voltage difference is compared said voltage difference being a function of the differential current.

4. A system as claimed in claim 1 wherein the means for estimating the value of the voltage at the terminals of the said one winding of the transformer include circuit elements producing voltages representative of the magnitudes of the self inductance of the said one winding and of the mutual inductance of the transformer respectively, the voltages thus produced being functions of the differential current.

* * * * *